May 9, 1967 C. T. DE WIT ETAL 3,317,983
METHOD OF MAKING A VIBRATORY CAPACITOR
Filed Oct. 7, 1964

INVENTORS
C. T. DE WIT
P. VAN HOESEL &
G. J. BOON

AGENT

United States Patent Office 3,317,983
Patented May 9, 1967

3,317,983
METHOD OF MAKING A VIBRATORY
CAPACITOR
Cornelis Teunis de Wit, Petrus Van Hoesel, and Gerardus
Johannes Boon, all of Eindhoven, Netherlands, assignors to North American Philips Company, Inc., New York, N.Y., a corporation of Delaware
Filed Oct. 7, 1964, Ser. No. 402,226
Claims priority, application Netherlands, Nov. 25, 1963, 300,961
3 Claims. (Cl. 29—25.42)

The invention relates to a method of estabilshing a connection between an electrode provided on a substantially flat body of inorganic, insulating material and a supply conductor.

An electrode applied to an insulating body by vapor deposition in vacuo or by cathode evaporation is solidly connected to the subjacent insulating layer and is therefore very desirable. However, to connect a supply conductor to such a thin film gives rise to serious difficulties requiring great care in making a solder connection.

This invention consists of a method of connecting a thin film electrode and supply or lead conductor which overcomes the difficulties connected with soldering and in addition provides substantial economies and is adapted to mass producing devices incorporating thin film electrodes. The invention eliminates soldering and briefly described consists of imbedding the supply conductor in an insulation body. The surface of the body upon which the film is to be deposited and to or through which the conductor extends is ground to the surface configuration desired with the conductor exposed and then the film is applied.

The invention will be described more fully with reference to the drawings, in which.

Figure 1:
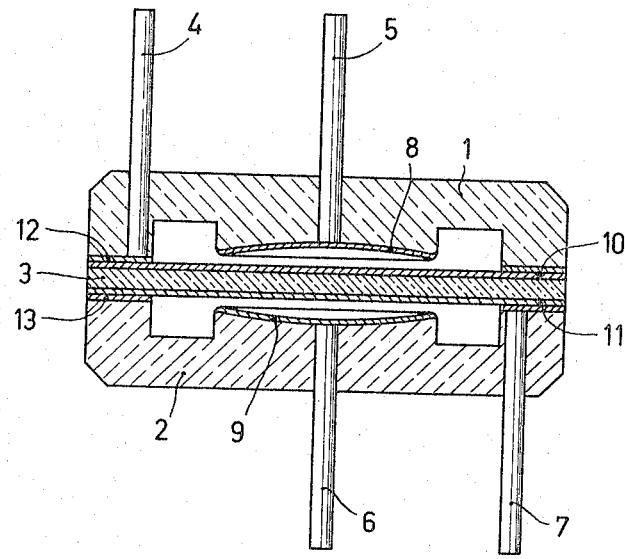
FIGURE 1 shows a cross-sectional view of the vibratory capacitor with conductors.

The drawing shows a sectional view of a vibratory capacitor having an electrode and a supply conductor arranged by the method according to the invention. Of course the method is not limited to manufacturing vibrating capacitors but will be described as having utility in connection therewith.

A vibratory capacitor consists mainly of three bodies 1, 2 and 3, for example of glass or quartz insulating material each of which is provided with film electrodes. The capacitor is a symmetrical structure, the outer insulating bodies 1 and 2 being located one on each side of the central, insulating body 3. The bodies 1 and 2 constitute the stationary parts of the vibratory capacitor, whereas the body 3, the thickness of which is shown on an exaggerated scale in the figure, is caused to perform the vibratory motions. The body 2 is provided with a conductive layer 9, which forms an electrode and which is arranged on a re-entrant part of a cavity formed between said body and the body 3. The body 3 is also provided on the upper side with a metal coating 10, serving as an electrode and being in electrical contact with a metal coating 12 along the edge of the body 1. The electrode 8 of the body 1 is provided with a supply conductor 5 and the electrode 12 is connected to a conductor 4, the voltage to be measured being operative between said conductors 4 and 5.

Likewise, the inner face of the body 2 is provided with an electrode 9 which co-operates with an electrode 11 formed on the lower side of the central body 3. Along the outer side of the body 2 the metal coating 13 is in conductive connection with said body. Between the connecting conductors 6 and 7 for the electrodes 9 and 11 an alternating voltage is applied which causes the membrane-shaped body 3 to perform mechanical vibrations.

Owing to the extremely small dimensions of the intermediate space it is desirable in vibratory capacitors that the electrodes should be as smooth as possible and obviously there should be a good electrical contact between the electrodes and the conductors. In accordance with the invention this is achieved by first pressing each of the electrodes into the material of the body, usually glass so that no air bubbles are present. The electrode and body are both heated to a high temperature to facilitate the pressing operation.

These glass bodies containing imbedded electrodes are then ground or polished away until the surface desired is obtained. When the metal and the glass are at the same level, which can be readily ensured within a tolerance of a few microns, the vapor-desposited metal layer, preferably a tantalum layer, is applied, and it has been found to form a very satisfactory connection with the supply conductors. The connection between the conductor and associated electrode remains intact even at high temperatures.

Figure 2:
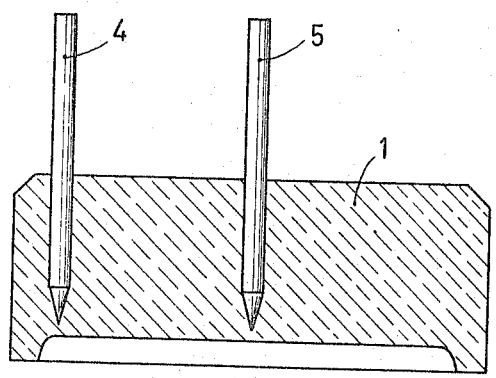
FIGURE 2 shows a cross-sectional view of the conductor elements imbedded in the glass insulator prior to grinding.

FIG. 2 shows the glass body 1 with the conductors 4 and 5 prior to the grinding operation. In the manufacture thereof a plug or mass of glass is pressed or dropped onto the conductors, which are arranged in a mold. The mold simultaneously shapes the outer side of the glass in the correct form.

A vibratory capacitor such as above described, manufactured according to the known soldering techniques would require considerable time and skilled labor. According to this invention such a capacitor can be manufactured economically and with a high degree of reliability.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A method of connecting a thin film electrode supported on a body of insulating material with a conductor comprising heating said body to a temperature at which said body material melts, pressing said conductor into but not through said body, shaping the surface of said body opposite the surface at which said conductor enters said body, said shaping including uncovering a portion of said conductor at said surface, and vapor depositing a thin film electrode on said shaped surface and said uncovered portion of said conductor.

2. A method of manufacturing a vibratory capacitor comprising molding a first and second body part at least one of which has imbedded therein and extending therefrom at least two conductors, shaping a face of each body part, said shaping including uncovering a portion of the conductors in at least one of said body parts, vapor depositing a thin metallic film on each said shaped face thereby covering said exposed conductors, said film providing a stationary capacitor electrode, and positioning a vibrating body part having a movable electrode between and in spaced relation from said shaped faces of said first and second body parts.

3. A method of connecting a thin film electrode supported on a body of insulating material with a conductor comprising injecting a mass of molten insulating material into a mold, supporting one or more conductors within said mold, said injected mass thereby forming a body having said conductor(s) as an integral part of said body and extending from one surface thereof, shaping the surface of said body opposite the surface from which the conductors extend, said shaping including uncovering a portion of said conductor(s) at said surface, and vapor depositing a thin film electrode on said shaped surface and said uncovered portion of said conductor.

References Cited by the Examiner
UNITED STATES PATENTS

| | | | |
|---|---|---|---|
| 2,752,662 | 7/1956 | Crooks | 29—25.35 |
| 3,002,137 | 9/1961 | Kahn | 317—261 |
| 3,134,930 | 5/1964 | Wright. | |

JOHN F. CAMPBELL, *Primary Examiner.*

WILLIAM I. BROOKS, *Examiner.*